Figure 1:
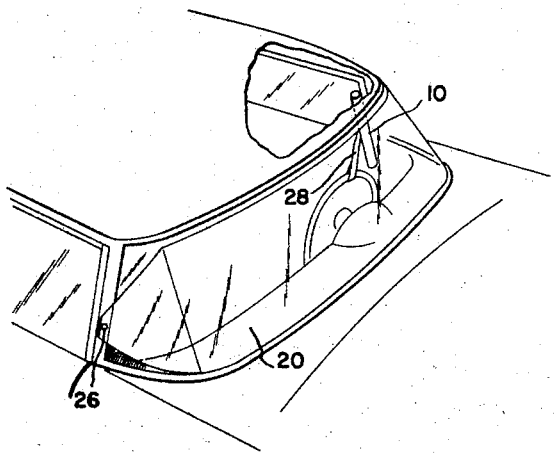

Sept. 9, 1958     A. S. McQUEEN     2,851,303
WINDSHIELD PROTECTOR
Filed March 25, 1957

INVENTOR
ALFRED S. McQUEEN

BY *Charles H. Johnson*

ATTORNEY

United States Patent Office 2,851,303
Patented Sept. 9, 1958

2,851,303

WINDSHIELD PROTECTOR

Alfred S. McQueen, Johnson City, Tenn.

Application March 25, 1957, Serial No. 648,101

3 Claims. (Cl. 296—95)

This invention relates to a device for protecting the windshield of a parked vehicle such as an automobile from the accumulation of frost, ice and snow.

It is an object of the present invention to provide a windshield protector which includes a member adapted to be positioned against the outside of the windshield and a casing into which said member is retracted when not in use, together with means for securing the casing and the free end of the member on the inside of the vehicle when said protector is in use whereby locking of the doors of the vehicle will prevent theft of the protector.

It is a further object of the invention to provide a windshield protector comprising a windshield covering member and a casing into which said member is retracted when not in use wherein the casing has means for cleaning any accumulated ice and snow from the covering member as said member is retracted into the casing.

It is a still further object of this invention to provide a windshield protector as above described which will fit any type of windshield including the presently popular wrap-around styles.

Other and further objects, features and advantages of the invention will become apparent as the description of a preferred embodiment thereof proceeds.

Figure 3:
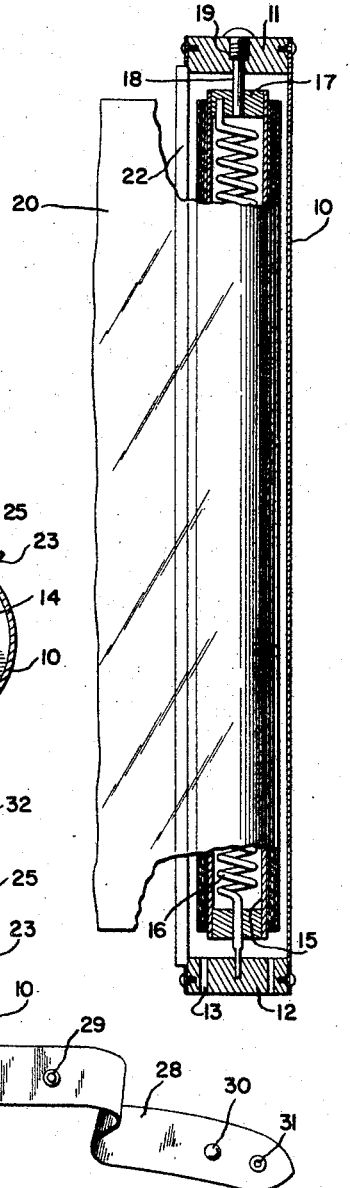
Figure 4:
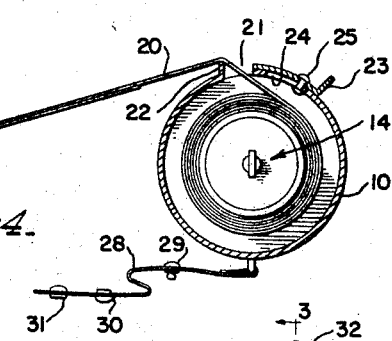
Figure 2:
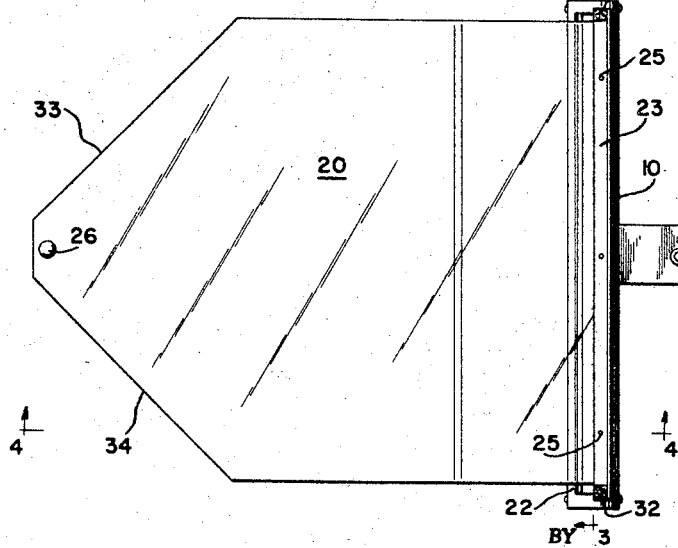

Referring now to the drawing:

Figure 1 is a perspective view of a portion of a vehicle showing the windshield protector of the present invention in position of use, Figure 2 is a plan view of the device showing the cover member partially withdrawn from the casing, Figure 3 is a view partially in section taken along the line 3—3 of Figure 2 and partially in plan, and Figure 4 is a view partially in section along the line 4—4 of Figure 2 and partially in side elevation.

The windshield cover of the present invention comprises a substantially cylindrical casing 10 which may be made by rolling a sheet of metal into the form of a tube. The ends of the casing 10 are closed by caps 11 and 12 held in place by suitable screws, as shown in Figure 3. The cap 11 completely closes its end of the tube but cap 12 may be provided with openings 13 the purpose of which will presently be explained. Instead of metal, the casing 10 may be formed of a suitable plastic material, in which case the cap 11 would be moulded integrally with the casing.

Mounted within the casing 10 is a spring roller generally designated 14 and comprising a tubular member 15 within which is positioned a spring 16 one end of which is secured to a collar 17 secured to one end of member 15 and the other end of which is secured to the cap 12. A stub shaft 18 having a screw threaded portion 19 is secured to the cap 11 and rotatably supports one end of the spring roller the other end of which is supported by the spring 16.

The windshield cover per se consists of an elongated strip 20 of flexible material secured at one end to the spring roller 14 and urged by the spring 16 to wind itself around the tubular member 15 of said spring roller. The member 20 preferably consists of a strip of polyethylene film since such material has the characteristics of being impermeable, tough and flexible but other suitable materials having these characteristics may be employed if desired.

To permit the cover member 20 to be pulled out from the casing 10, said casing is provided with a slot 21 extending longitudinally of the casing for substantially the full length thereof. An outwardly directed flange 22, the purpose of which will presently be explained, is provided on the casing 10 adjacent one edge of the slot 21 and said flange may be formed integrally with said casing or may be a separate piece secured to said casing.

Mounted on the casing 10 adjacent the edge of the slot 21 opposite the flange 22 is a manually manipulatable slide member 23. The casing is provided with circumferentially extending slots 24, one of which is indicated in Fig. 4, and rivets 25 or the like secured to the slide 23 extend through the slots 24 to hold the slide on the casing and permit said slide to be moved from the position shown in the drawing to a position substantially closing the slot 21.

The free end of cover member 20 is folded back and adhered to itself for purposes of reinforcement and at the extreme outer end said cover member has secured thereto the female member 26 of a snap fastener, the male member of which is permanently secured at a suitable point along the right-hand door post of the vehicle with which the windshield protector is to be used. In order to prevent the cover member 20 from being completely retracted into the cover 10, a relatively thick piece of sponge rubber 27 is positioned between the folds of the cover member and held in place by the snap fastener member 26.

A strap 28 is secured to the casing 10 substantially diametrically opposite the slot 21 and has secured therein a male snap fastener element 29 and two female fastener elements 30 and 31. The fastener element 30 faces the opposite side of the strap from the element 29 so that when the protector is not in use and the cover 20 is retracted into the casing 10, the strap 28 may be wound around the casing with the male fastener 29 facing outward and the element 30 will be aligned for snapping onto the fastener 29 to hold the strap neatly in position around the casing. The element 31 is employed to cooperate with the element 29 when the protector is in use as will now be explained.

When the protector is to be positioned about the windshield of a vehicle as shown in Fig. 1, the fastener element 26 at the free end of the cover 20 is first snapped to the right-hand front door post. It has been previously mentioned that a snap element for cooperating with the snap element 26 is fixed in the door post. In practice the element for cooperating with the snap element 26 is fixed inside the vehicle so that when the doors are locked the protector cannot be detached from outside but in the drawing, for simplicity of illustration, the free end of the cover is shown snapped on the outside. After snapping the free end of the cover to the right-hand door post the operator holds the casing 10 in his hand and walks around the front of the vehicle to the left-hand side, the spring roller 14 allowing the cover to be withdrawn from the casing, and by means of the strap 28 and the two fastener elements 29 and 31 attaches the casing to the steering wheel or other convenient place inside the vehicle. The spring drum 14 holds the cover tightly against the windshield and since the two ends are inside the vehicle, theft of the protector can be prevented by locking the doors of the vehicle.

When the protector is removed from the vehicle and after it may have accumulated a coating of frost, ice or snow which otherwise would have been on the windshield itself, the strap 28 of the casing is unsnapped first and the operator, as he moves around the front of the vehicle to the right-hand side, holds the casing so that as the cover 20 is retracted into the casing it is bent angularly over the flange 22, substantially as shown in Fig. 4. This bending of the cover over the flange 22 causes the ice adhering to the cover to be cracked loose therefrom, it being understood that the side of the cover toward the top of the drawing in Fig. 4 is the side that faces away from the windshield. In order to prevent the ice cracked from the cover from entering through the slot 21 into the inside of the casing 10, the operator presses the slide 23 toward the flange 22 so that it bears against the cover member 20 and scrapes the loosened ice away from the cover or cleans the snow therefrom in the event that the cover is coated with snow rather than with ice.

It is contemplated that the device will be held alongside the steering column by means of a flashlight clip when not in use and by placing it so that the end with the openings 13 faces downward, any moisture that should get into the casing will escape through said openings.

To decrease the likelihood of the casing 10 being held in such manner that the cover 20 will wind irregularly onto the roller and perhaps become bound by one end of the slot 21, the casing is provided with indicating means in the form of marks 32 adjacent the ends of the slot 21. By keeping the edges of the cover aligned with these marks, a smooth winding of the cover onto the roller will be assured.

The free end of the cover 20 is tapered at 33 and 34 and by varying the taper the cover can be made to lie flat against differently formed windshields. The end of the cover which is secured to the spring roller will lie flat because the strap 28 will permit the casing 10 in which said roller is mounted to swing at whatever angle is necessary for that purpose.

Having thus described one embodiment of the invention, what is claimed is:

1. In a device of the character described, a cylindrical casing, a slot in said casing extending longitudinally thereof, said slot being substantially coextensive with the length of said casing, a spring roller mounted within said casing, an elongated windshield cover member having one end secured to said spring roller and having a free end extending through said slot, said spring roller being constructed and arranged to continuously urge said cover member toward the inside of said casing, means on said casing for securing said casing on the inside of a vehicle adjacent one end of the windshield thereof, means on said cover member for securing the free end of said cover member to the vehicle adjacent the opposite end of the windshield with said cover member lying against the outside of the windshield, a substantially radially outwardly projecting flange on said casing extending along one edge of said slot over which said cover member may be flexed to change its direction of travel and thereby crack any accumulated ice or frost therefrom as said cover is being retracted into said casing, and a manually manipulatable slide member mounted on said casing adjacent the other edge of said slot, said slide member being arranged to be moved into close proximity with said flange during retraction of said cover member whereby the opening through said casing is reduced to an amount just sufficient to accommodate the thickness of said cover member so that said cover member will be scraped clean as it is retracted into said casing.

2. In a device of the character described, a cylindrical casing, a slot in said casing extending longitudinally thereof, said slot being substantially coextensive with the length of said casing, a spring roller mounted within said casing, an elongated windshield cover member having one end secured to said spring roller and having a free end extending through said slot, said spring roller being constructed and arranged to continuously urge said cover member toward the inside of said casing, means for preventing complete retraction of said cover member into said casing, a substantially radially outwardly projecting flange on said casing, said flange being adjacent said slot and extending along one edge thereof for substantially the full length thereof whereby said cover member may be bent over said flange to change its direction of travel during retraction and thereby crack the accumulated ice therefrom, and a freely movable slide member mounted on said casing adjacent the other edge of said slot, said slide member being of substantially the same length as said flange, said slide member being adapted to be moved manually into close proximity to said flange during retraction of said cover member into said casing whereby said cover member is scraped free of accumulated ice and snow.

3. In a device of the character described, a cylindrical casing, a slot in said casing extending longitudinally thereof, said slot being substantially coextensive with the length of said casing, a spring roller mounted within said casing, an elongated flexible windshield cover member having one end secured to said spring roller and having a free end extending through said slot, said spring roller being constructed and arranged to continuously urge said cover member toward the inside of said casing, means on said cover member adjacent the free end thereof to prevent complete retraction of said cover member into said casing, a substantially radially outwardly projecting flange on said casing extending along one edge of said slot, said flange being on that side of the slot adjacent the face of the cover member which lies against the windshield when the device is in use whereby said cover may be flexed over said flange to change its direction of travel and thereby crack any ice which may have accumulated on said cover member, and a manually manipulatable slide member mounted on said casing adjacent the other edge of said slot, said slide being arranged to be moved toward and from said flange to varying positions during retraction of said cover member depending upon the amount of accumulated deposit on said cover member, whereby said cover member may be completely cleaned of ice and snow during retraction thereof into said casing.

References Cited in the file of this patent

UNITED STATES PATENTS

| | | |
|---|---|---|
| 580,697 | Kraemer | Apr. 13, 1897 |
| 1,427,038 | Toadvine | Aug. 22, 1922 |
| 1,834,513 | Bredin | Dec. 1, 1931 |
| 2,236,986 | Beeman et al. | Apr. 1, 1941 |
| 2,599,066 | Osborn | June 3, 1952 |
| 2,723,714 | Moore | Nov. 15, 1955 |